(12) United States Patent
Frank

(10) Patent No.: US 10,480,487 B2
(45) Date of Patent: Nov. 19, 2019

(54) HUB OF A WIND TURBINE

(75) Inventor: Hubertus Frank, Höchstadt (DE)

(73) Assignee: IMO Holding GmbH, Gremsdorf (DE)

( * ) Notice: Subject to any disclaimer, the term of this patent is extended or adjusted under 35 U.S.C. 154(b) by 648 days.

(21) Appl. No.: 14/240,873

(22) PCT Filed: Aug. 27, 2012

(86) PCT No.: PCT/EP2012/003599
§ 371 (c)(1),
(2), (4) Date: Jul. 8, 2014

(87) PCT Pub. No.: WO2013/026582
PCT Pub. Date: Feb. 28, 2013

(65) Prior Publication Data
US 2014/0356169 A1 Dec. 4, 2014

(30) Foreign Application Priority Data

Aug. 25, 2011 (EP) .................................. 11006947

(51) Int. Cl.
*F03D 7/04* (2006.01)
*F16C 35/04* (2006.01)
(Continued)

(52) U.S. Cl.
CPC ............. *F03D 7/04* (2013.01); *F03D 1/0691* (2013.01); *F03D 7/0224* (2013.01); *F03D 80/70* (2016.05); *F16C 19/16* (2013.01); *F16C 33/581* (2013.01); *F16C 35/04* (2013.01); *F05B 2260/79* (2013.01); *F16C 2300/14* (2013.01);
(Continued)

(58) Field of Classification Search
CPC ...... F03D 1/0658; F03D 80/70; F03D 7/0224; F03D 7/04; F16C 33/04; F16C 35/04; F16C 19/16; F16C 33/581; F05B 2240/50; F05B 2260/79; Y02E 10/721; Y02E 10/722
See application file for complete search history.

(56) References Cited

U.S. PATENT DOCUMENTS 7,077,630 B2 *  7/2006  Wobben ................ F03D 1/0658
                                                              416/155
7,780,417 B2 *  8/2010  Kirchner ............... F03D 1/0658
                                                              416/155
(Continued)

FOREIGN PATENT DOCUMENTS

DE       28 55 025        8/1980
DE       3415428 A1 *    10/1985   ........... F03D 7/0224
(Continued)

OTHER PUBLICATIONS

NSK LTD., Large-Size Rolling Bearings, Catalog, Japan, 1989, p. 32.

*Primary Examiner* — Ninh H. Nguyen
*Assistant Examiner* — Jesse M Prager
(74) *Attorney, Agent, or Firm* — Pandiscio & Pandiscio

(57) ABSTRACT

A wind turbine hub having both blades mounted thereon by means of blade bearings adjustable about the longitudinal axes thereof. The turbine includes means for effecting multi-axes adjustments of a plurality of elements relative to one another. The elements are rotatable about bearings having selectively oriented axes of rotation, each bearing comprising two parts rotatable relative to each other.

23 Claims, 2 Drawing Sheets

(51) Int. Cl.
  *F03D 1/06*   (2006.01)
  *F16C 19/16*  (2006.01)
  *F16C 33/58*  (2006.01)
  *F03D 7/02*   (2006.01)
  *F03D 80/70*  (2016.01)

(52) U.S. Cl.
  CPC ......... *F16C 2360/31* (2013.01); *Y02E 10/721* (2013.01); *Y02E 10/722* (2013.01)

(56) References Cited

U.S. PATENT DOCUMENTS

| | | | | |
|---|---|---|---|---|
| 8,172,531 | B2* | 5/2012 | Wadehn | F03D 1/0658 384/100 |
| 8,282,353 | B2* | 10/2012 | Russ | F03D 1/0658 416/131 |
| 8,568,098 | B2* | 10/2013 | Numajiri | F03D 7/0224 415/108 |
| 2009/0311104 | A1* | 12/2009 | Steffensen | F03D 1/0658 416/204 R |
| 2010/0092120 | A1* | 4/2010 | Nies | F16C 19/10 384/513 |
| 2011/0142618 | A1* | 6/2011 | Moore | F03D 1/0658 415/229 |
| 2012/0220418 | A1* | 8/2012 | Frank | F16H 1/28 475/331 |

FOREIGN PATENT DOCUMENTS

| | | | | |
|---|---|---|---|---|
| WO | WO 00/61942 | | 10/2000 | |
| WO | WO 2011042131 A1 | * | 4/2011 | ............ F16H 1/28 |

* cited by examiner

HUB OF A WIND TURBINE

BACKGROUND OF THE INVENTION

1. Field of the Invention

The invention is directed to a device for the multi-axis adjustment of a plurality of elements relative to one another, wherein the elements are rotatable relative to one another via two or more bearings having differently oriented axes of rotation, and wherein each bearing has two parts that can be rotated relative to each other about their respective axes of rotation, particularly to a hub of a wind turbine having rotor blades that are mounted to the hub by means of blade bearings and can be adjusted about their respective longitudinal axes.

2. Description of the Prior Art

Modern large rolling bearings have diameters above the 2-meter range in many applications, and use cases involving diameters of 5 or even 8 meters are not uncommon nowadays. One example of such an application is modern wind turbines, whose wind wheels are constantly being built larger to increase performance. The larger the diameter of such a bearing, the more important its rigidity, since even slight deformation of the bearing rings will alter the pressure on the rolling elements, not only causing greater losses, but also reducing the achievable service life of the rings. On the other hand, increased rigidity means an increased thickness for the rings, and thus, of course, a larger mass, i.e., a greater weight. Since this is unacceptable in many applications, the mating structure itself is usually enlisted to increase rigidity; this does not substantially change much either, however, since the weight of the mating structure then increases as well, leading to the same disadvantages in most cases. This is especially true of wind turbines, where a number of large rolling bearings are installed, here as gondola or nacelle bearings, there as main or rotor bearings for the rotating wind wheel, and finally as blade bearings for adjusting the rotor blades as a function of wind speed.

SUMMARY OF THE INVENTION

From the disadvantages of the described prior art comes the problem initiating the invention: to improve an arrangement of the above species, particularly an adjusting device or hub of a wind turbine, so as to ensure rigidity for the bearings even under extremely high stresses while at the same time keeping the mass required for this purpose to a minimum.

The solution to this problem is achieved, in an adjusting device of this species, in that one rotatable part in each of at least two bearings is formed by processing or shaping a common, multiple-connected base body, particularly by processing or shaping the hub body of a wind turbine, thus uniting these rotating parts with one another, wherein the extent of a bearing parallel to the axis of rotation, measured across all the raceways between the base body and the particular element, is shorter than the radius of the particular bearing, whereas the respective other rotatable part of the bearing is configured as a double-connected ring having a planar abutment surface and is separate from the particular element and is screwed together with the abutting contact surface of the respective element via coronally arranged fastening bores extending parallel to the axis of rotation of the particular bearing.

The invention achieves the effect that the adjustable elements, particularly rotor blades of a wind turbine, can be rotated relative to one another via open-center large rolling bearings having differently oriented axes of rotation, the elements, particularly rotor blades of a wind turbine, can be rotated relative to one another via open-center large rolling bearings having differently oriented axes of rotation [repetition sic], wherein at least two open-center large rolling bearings have only one ring each, whereas their double-connected parts that are able to rotate relative to the ring are formed by processing or shaping a common base body and are unified with each other, particularly by processing or shaping the hub body of a wind turbine. In the hub of a wind turbine, the outer rings of at least two blade bearings are embodied in one piece with the hub body, so that at least one raceway of each of a plurality of blade bearings having differently oriented axes of rotation is formed on a common hub body.

The invention thereby deviates from conventional large rolling bearings with two mutually concentric rings which are then screwed to the particular mating structure. Even such screw connections do not make for a completely rigid connection, of the kind obtained by welding, for example, and further require thick rings or plates on the mating structure to produce the necessary rigidity. Instead, the invention makes use of the fact that in certain cases a number of adjacent bearings are present that nevertheless have differently oriented axes of rotation; "fusing" a circumferential portion of each of these bearings to a common body results in a three-dimensionally curved component, and curvatures of this kind constitute a very rigid design even for thin, i.e., wall-like components, especially if they possess a double convex curvature, for example like the surface of a sphere, or—depending on the perspective—a double concave curvature, for example like the inner surface of a hollow sphere. This is because (hollow) spheres constitute a form that is exactly defined topographically and therefore undergo little deformation, i.e., are extremely stable. This means that the shaping of such a component common to both or all of the large rolling bearings stabilizes them with respect to one another, that is, no additional masses are necessary for stabilization, but instead, the already-present masses of the participating large rolling bearings themselves contribute in large part to the rigidification, and moreover do so directly, i.e., without the interposition of additional, possibly elastically acting elements, such as screws, for example.

In the context of a hub of a wind turbine having rotor blades that are mounted to the hub by means of blade bearings and can be adjusted about their respective longitudinal axes, the inventive idea is actualized by the fact that the outer rings of at least two blade bearings are embodied in one piece with the hub body, such that at least one raceway of each of a plurality of blade bearings having differently oriented axes of rotation is formed on a common hub body, wherein the extent of the entire blade bearing parallel to the blade bearing axis of rotation, measured across all the raceways of that blade bearing, is shorter than the radius of the blade bearing, whereas, as counterpart thereto, outer rings integrated with the hub body are each provided with one respective inner ring, which is separate from the rotor blade and is screwed to the rear end face of the particular rotor blade via coronally arranged fastening bores extending parallel to the longitudinal axis of the particular rotor blade.

This design takes advantage in particular of the fact that due to their higher torsional rigidity, the rolling-element raceways integrated with the hub body always remain optimally precisely aligned, thus ensuring smooth and wear-free rotation.

It has proven advantageous if one raceway in each of a plurality of large rolling bearings having differently oriented axes of rotation is formed by processing or shaping a common base body, particularly by processing or shaping the hub body of a wind turbine. In such a case, not only is the base body according to the invention combined with a respective ring for each large rolling bearing, but the respective raceways are also incorporated directly into this base body, and consequently there are neither any gaps nor any flexible elements between the rows of circulating rolling elements, so the rigidity of the structure as a whole is maximal.

Configuring the common base body or hub body as hollow or sleeve-shaped, particularly corresponding to the jacket surface—provided with through-holes—of a point-symmetric or rotationally symmetric body—makes it possible to minimize its mass without compromising dimensional stability.

It is within the scope of the invention that a raceway of the base body or hub body is incorporated into a concave surface region thereof. The outer raceway of a large rolling bearing can be integrated into such a surface region, particularly by having a raceway-containing region of the base body or hub body be formed by a concavely curved region in the region of the inner face of an opening preferably passing all the way through the jacket of a hollow or sleeve-shaped base body or hub body.

The invention recommends providing a preferably continuous row of teeth on the common base body or hub body next to a raceway for the rolling elements of each rolling bearing, particularly blade bearing. This creates the possibility of relative adjustment of the various bearings, particularly by means of pinions, toothed wheels, or the like, engaging in this row of teeth.

Further advantages are obtained if at least one row of teeth is offset from the particular raceway in parallel with the particular axis of rotation, preferably toward the interior space or center of the base body or the hub. In such a case, the row of rolling elements absorbing the load-bearing forces is shifted as far as possible toward the rotating part to be adjusted.

Further, at least one row of teeth should be offset from the particular raceway radially to the particular axis of rotation, preferably toward the particular axis of rotation. Such a design makes it possible, for example, to arrange the ring rotating opposite the base body next to the teeth, which can be advantageous from a design standpoint.

If the row of teeth is straight-toothed, then straight-toothed pinions or toothed wheels can mesh with it. Straight toothing can usually be produced with the least possible expenditure.

In addition, for each blade bearing, a respective anchoring arrangement or thrust surface for at least one seal is preferably provided on the common base body or hub body concentrically with each raceway, particularly offset outwardly in relation to the base body or hub body, i.e., away from the center thereof. By means of seals inserted therein, the interior space of a hollow base body can be sealed against the outside in the region of the transition to the mated-on rotating parts in order to shield it from external influences, especially the weather.

The invention can be developed further in that for each blade bearing, one or more fastening means for at least one cover plate or for a bearing shield is additionally provided on the common base body or hub body concentrically with each raceway, particularly offset inwardly in relation to the base body or hub body, i.e., toward the center thereof. Such cover plates or bearing shields can create a seal inside the annular large rolling bearings, particularly inside their inner rings. They can thus, under some circumstances, help to further rigidify the structure as a whole and/or serve as a mounting platform, for example for one or more drive motors.

Fastening means provided for mounting such cover plates or bearing shields can be embodied as fastening bores that are arranged distributed coronally around the particular axis of rotation, and which then afford multiple screw connections between the parts involved.

The invention allows of further development in that a raceway disposed opposite the raceway incorporated into the base body or hub body is incorporated into a ring, particularly into a convex surface region thereof. Another option would be to instead incorporate this second raceway into the periphery of a disk. This arrangement does usually entail greater weight and can therefore be advantageous in special use cases, particularly if the base body is to be hermetically sealed even inside such a rotating connection; in many use cases, however, where this consideration does not come into play, weight can instead be saved by giving the rotating part of the large rolling bearing an annular structure.

Further advantages are obtained by additionally providing, on a ring containing a raceway, a preferably fully circumferential row of teeth arranged concentrically with the raceway for the rolling elements of the rolling bearing concerned. This row of teeth is also used for rotational adjustment of the machine part connected to said ring.

If a set of teeth is also provided on the base body adjacent to the above-mentioned set of teeth, then the invention recommends selecting the number of teeth $z_1$ in the toothing on the base body so that it is slightly different from the number of teeth $z_2$ on the particular ring, i.e., $z_1 \neq z_2$, but $z_1 \approx z_2$. This creates the option of making a rotational adjustment by means of one or more toothed wheels, each having a uniform number of teeth $z_3$ and engaging in both sets of teeth together.

Such a row of teeth on a ring or a disk-shaped rotating part can be offset from the particular raceway radially to the particular axis of rotation, preferably toward the particular axis of rotation. One such arrangement that has proven advantageous has the respective raceway of a ring disposed on its outer side while its teeth are located on its inner side, i.e., radially speaking, offset toward the particular axis of rotation.

As noted earlier hereinabove, there can be use cases in which a disk-shaped geometry for the part that is rotatable relative to the base body is to be preferred over an annular geometry, and for a use case of this kind, the invention provides that the ring be provided with, connected to or integrated with a cover plate or a bearing shield. Such a cover plate or bearing shield can, in turn, have a through-hole at its center, but it also can be configured as continuous, without an opening.

A preferred design rule provides that a drive device is provided, particularly that a drive motor is fastened and/or a drive pinion mounted or guided, on at least one cover plate or at least one bearing shield. Such a cover plate or bearing shield can be used to draw conclusions as to force, in order to achieve a defined adjustment.

An additional feature of the invention is that the drive device, particularly the drive motor and/or the drive pinion, is arranged concentrically with the axis of rotation of the particular rolling bearing. This produces an arrangement that is ideally concentric or coaxial with the particular axis of rotation, which accordingly causes the least possible imbalance and thus makes for particularly smooth operation of all the rotating parts involved. Moreover, a concentric drive can be coupled to a sun gear that transmits the rotational movement to a gear train.

In the latter case, a further development is to arrange a plurality of planet gears in the annular space between the outer toothing of the drive pinion or sun gear, the cover plates or bearing shields, and the inner toothing of the rotatable ring. The arrangement thus takes on the characteristics of a planetary gear train.

These planet gears can be mounted in cantilever fashion, i.e., without a spider or planet carrier. On the one hand, the absence of a spider or planet carrier further simplifies the arrangement as a whole; on the other hand, weight can be saved in this way.

To save still more weight, the planet gears themselves can be configured as hollow. It should be kept in mind, here, that in a planetary gear train the tooth differential between the sun gear and the gear ring has an effect on gear ratio. Thus, if a particularly large tooth differential is desired, the diameter of the sun gear must be chosen to be substantially smaller than the diameter of the gear ring, with the result that the planet gears, which mesh with the sun gear on the one side and the gear ring on the other, receive a very large diameter, which is preferably larger than the diameter of the sun gear. In such a case, a substantial reduction in weight can be achieved if the planet gears are configured as hollow, particularly annular. The hollow space can, for example, be used as a reservoir for a lubricant, particularly grease.

If the planet gears mesh with the inner teeth both on the inner side of the ring and on the inner side of the opening in the base body or hub body, a still higher gear ratio can be obtained, particularly in the manner of a Wolfrom gear train; to this end—as explained previously hereinabove—the number $z_2$ of teeth in the toothing on the inner side of the ring and the number $z_1$ of teeth in the toothing on the inner side of the respective opening in the base body or hub body differ slightly from each other: $z_1 \neq z_2$, with $z_1 \approx z_2$.

BRIEF DESCRIPTION OF THE DRAWINGS

Further features, details, advantages and effects based on the invention will emerge from the following description of a preferred embodiment of the invention, read with reference to the drawing. Therein.

DESCRIPTION OF THE PREFERRED EMBODIMENTS

Figure 1:
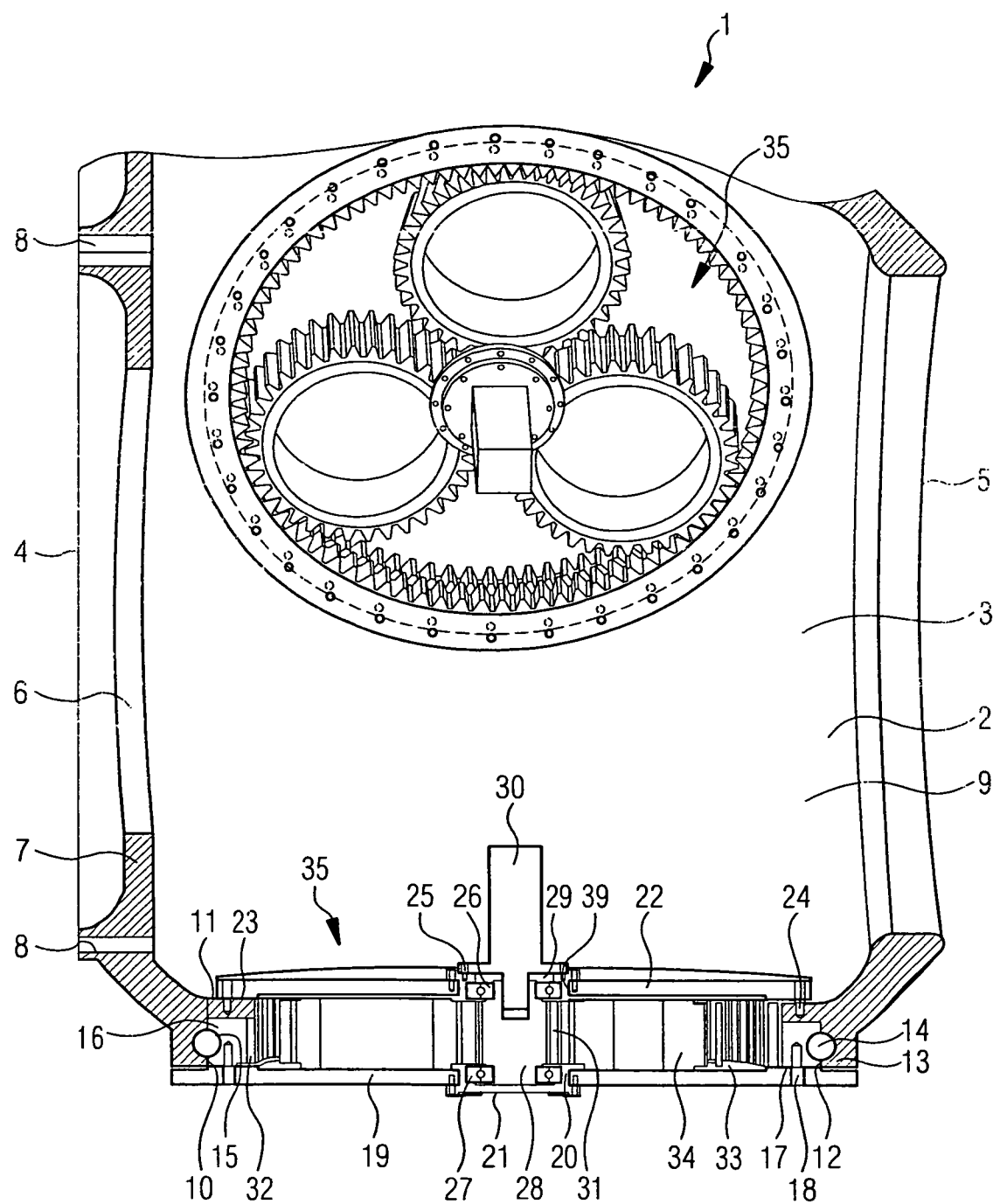
FIG. 1 is a partially broken-away sectional view through a wind turbine hub according to the invention.

FIG. 1 depicts a hub 1 of a wind turbine, as an example of a device according to the invention for adjusting a plurality of elements relative to one another. This broken-away sectional representation reveals the hub body 2, which has approximately the shape of a ring with multiple openings therethrough. This ring has, for example, a jacket 3 with an approximately cylindrical structure, preferably tapering to both end faces 4, 5.

On the end face 4 proximate the nacelle, the end-face opening 6 there is narrowed further by a circumferential, inwardly projecting flange 7. Provided therein is a plurality of fastening bores 8 to effect attachment to an output-side rotation device, for example a main bearing of the wind turbine, a gearbox input or a generator.

The end face 5 remote from the nacelle, on the other hand, can be closed off directly or by means of a cowl (not shown), to keep the oncoming wind out of the interior space 9 of the hub 1.

The jacket 3 of this one-piece hub body 2 has a plurality of through-holes 10, each for the rotatable connection of a respective rotor blade (not shown)—in the present case, by way of example, three thereof.

In the region of the rim 11 of such a through-hole 10, the shape of the hub body 2 deviates from the ideal cylindrical shape, specifically in such a way that the circumferential rim 11 of a through-hole 10 lies entirely in one plane.

In the concave inner side 12 of a through-hole 10 there is an annular raceway 13 formed or incorporated into the hub body 2 and provided for rolling elements 14 rolling thereon. In the case of spherical rolling elements 14, this raceway has, for example, a concave cross section.

The counterpart to this raceway 13 is formed by another, annular raceway 15 on the outer side of a ring 16, which is disposed in the through-hole 10 and, for its part, has for example a rectangular or even square cross section, and which, by virtue of the rolling elements 14, is able to rotate relative to the hub body 2 about the center axis of the particular jacket-side through-hole 10.

Disposed in the preferably planar end face 17 of this rotatable ring 16 that faces away from the interior space 9 of the hub body 2 is a plurality of coronally distributed bores 18 for connecting a rotor blade. The bores 18 are preferably configured as blind bores provided with internal threading.

In this case, a planar, preferably annular sealing plate 19 is preferably inserted between the outward-facing end face 17 of the rotatable ring 16 and a rotor blade fastened thereto, and is clamped in place by tightening the particular screws, thereby tightly sealing the interior space 9 inside the rotatable ring 16 in this region. A central opening 20 in the center of the closing plate 19 can be sealed by a closing cap 21 engaging therein.

A similar sealing plate 22 is fixed to the inner surface 23, facing interior space 9, of the rim 11 of through-hole 10, particularly by means of screws that engage through openings in the sealing plate 22 and are screwed into coronally distributed, internally threaded blind bores 24 in the inner surface 23 of the rim 11 of through-hole 10. The sealing plate 22 can also have an annular base area, with an opening or through-hole 39 in the center.

A ring 25 can be inserted in this through-hole 39, and in turn receives against its inner periphery the outer ring of a rolling bearing 26. A similar rolling bearing 27 is disposed on the inner side of the closing cap 21. The inner rings of these two rolling bearings 26, 27 support a toothed sun gear 28 rotatably about a central axis. The sun gear 28 has in its end face 29 turned toward the interior space 9 of the hub body 2 a central opening, for example having a polygonal cross section, particularly for coupling to it a drive motor 30 in a rotationally fixed manner, for example for the insertion of a motor output shaft or a square or hexagonal piece or the like at the end of a rotating body that can be driven by a motor (not shown).

The sun gear 28 has a circumferential set of teeth 31 on its outer periphery. A set of teeth 32 with the same modulus is located on the radially inwardly disposed side of the rotatable ring 16, facing the teeth 31 of the sun gear 28.

Since the two sealing plates 19, 22 are at a distance from each other, there remains between these sealing plates 19, 22 and the teeth 31, 32 on the sun gear 28, on the one hand, and on the radially inwardly disposed side of the rotatable ring 16 an approximately annular hollow space 33 in which a plurality of toothed planet gears 34 are received—specifically, depending on the embodiment, are cantilever-mounted or spiderlessly guided or mounted on a spider or a sealing plate 19, 22.

For this purpose, the pitch circle diameter $d_P$ of a toothed planet gear 34 corresponds to the difference between the pitch circle diameter $d_S$, $d_H$ of the sets of teeth 31, 32 on the sun gear 28, on the one hand, and on the radially inwardly disposed side of the rotatable ring 16, on the other hand: $d_P = d_H - d_S$.

Due to the cantilevered mounting, the planet gears 34 can be configured as hollow.

As a result of the sun gear 28 being driven in rotation by the drive motor 30, the planet gears 34 are constrained to move around the sun gear 28, thus imparting a slow rotational movement to the ring 16 meshing therewith via its teeth 32.

Hence, the structure obtained is that of a planetary gear train 35 with sun gear S, 28, planet gears P, 34 and the rotatable ring 16 as gear ring H. The standard gear ratio of this planetary gear train $i_{12}$ is defined by the quotient of the numbers of teeth H/S of the sun gear S and the gear ring H, or the quotient of their pitch circle diameters $d_H/d_S$: $i_{12} = H/S = d_H/d_S$. If the planet gears 34 are mounted, for example, to the sealing plate 22, the rotation speed ratio is $n_H/n_S = 1/i_{12} = S/H = d_S/d_H$, thus a rotation speed $n_H$ that is lower than the input rotation speed $n_S$ by a factor of $1/i_{12}$.

Figure 2:
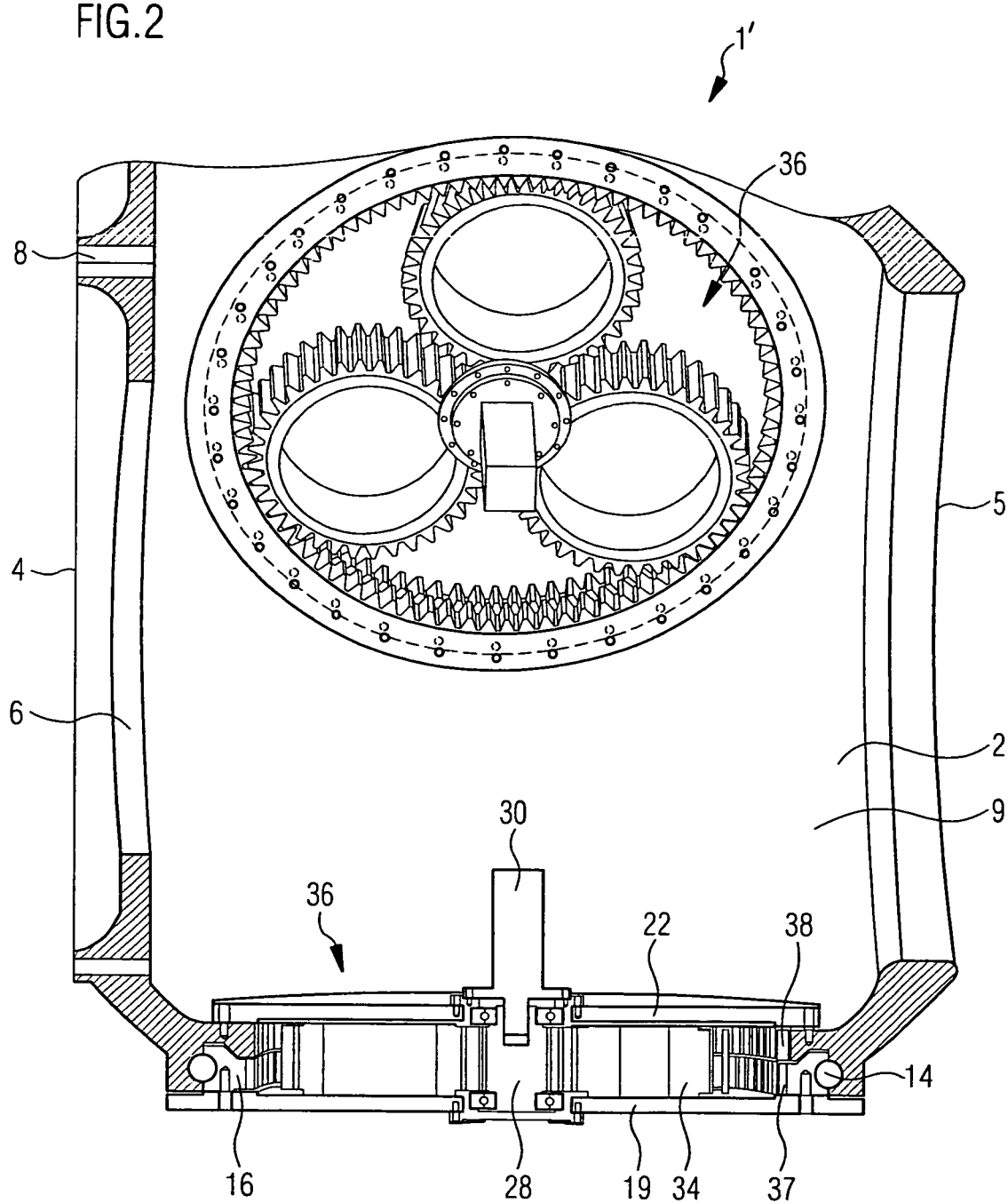
FIG. 2 is a view corresponding to FIG. 1 of a modified embodiment of the invention.

In the case of hub 1' according to FIG. 2, this rotation speed $n_H$ can be reduced further by using a Wolfrom gear train 36 instead of the planetary gear train 35 from FIG. 1. The Wolfrom gear train 36 differs from the planetary gear train 35 primarily in the region of the gear wheel H:

Whereas the set of teeth 32 of the gear wheel H in the planetary gear train 35 is disposed entirely on the rotatable ring 16 and thus is not divided in the axial direction, the Wolfrom gear train 36 has in the region of the gear wheel H two toothed regions 37, 38 that are separated from each other in the axial direction. The toothed region 37 that is the lower of the two in FIG. 2 is again located on the radially inwardly disposed side of the rotatable ring 16, but the upper toothed region 38 is not. Instead, the latter is located on the radially inwardly disposed side of the rim 11 of a through-hole 10 in the hub body 2.

Further, in a preferred embodiment, the pitch circle diameters $d_1$, $d_2$ of these two toothed regions 37, 38 are identical.

The teeth $H_1$, $H_2$ in the two toothed regions 37, 38 do differ slightly from each other: $H_1 \neq H_2$, $H_1 \approx H_2$, with $\Delta Z = H_1 - H_2$.

This yields, for instance, a gear ratio $n_H/n_S$:

$$n_H/n_S = \frac{S \cdot (H_1 - H_2)}{H_1 \cdot (H_1 + S)}$$

which is much larger than in the case of the planetary gear train 35 according to FIG. 1. Due to the high speed ratio and the resultant high torque reduction, a much smaller and lower-performance drive motor 30 will suffice with the Wolfrom gear train 36 than in the case of the exclusively planetary gear train 35 according to FIG. 1.

If the tooth differential $\Delta Z = H_1 - H_2$ is equal to the number p of planet gears 34: $\Delta Z = H_1 - H_2 = p$, it is feasible to use one-piece planet gears 34 arranged at approximately equidistant intervals around the central sun gear 28. If $\Delta Z = H_1 - H_2 \neq p$, at least one planet gear 34 must have two mutually offset toothed regions. However, this can easily be achieved by taking two gear bushings, each with a uniform toothed region, and sliding them in the offset state onto a central body or central bushing in such a way that they are fixed in rotation. Such a rotationally fixed connection can be created, for example, by means of intermeshing teeth between the central body or central bushing, on the one hand, and the gear bushings, on the other.

The invention claimed is:

1. A hub of a wind turbine having rotor blades adjustable about their longitudinal axes and mounted to the hub by means of blade bearings, wherein the hub comprises:
   a hub body comprising a jacket, the jacket defining an interior space and having a plurality of openings extending completely through the jacket and communicating with the interior space;
   an outer ring formed integral with the jacket and extending about the perimeter of one of the plurality of openings extending through the jacket, the outer ring comprising an outer surface facing away from the jacket, an inner surface facing the interior space, and an annular opening defined by an annular surface;
   an inner ring sized to be rotatably received in the annular opening of the outer ring;
   an inner sealing plate mounted to the inner surface so as to seal the inner ring from the interior space;
   an outer sealing plate facing away from the jacket;
   wherein the inner ring comprises a circumferentially-extending sidewall extending between the inner sealing plate and the outer sealing plate, the circumferentially-extending sidewall having an inner surface and an outer surface;
   a gearbox comprising a central sun gear and a plurality of planetary gears disposed about the central sun gear;
   wherein the outer ring extends radially outboard of the jacket such that the inner surface of the outer ring defines a concave curved region facing the interior space, and such that the outer surface of the outer ring defines a convex curved region facing away from the jacket;
   wherein an inner rim is formed in the annular surface of the outer ring such that the inner rim extends around the annular opening of the outer ring, and at least one outer raceway is formed in the annular surface of the outer ring such that the at least one outer raceway extends around the annular opening of the outer ring, the at least one outer raceway being disposed concentric with the inner rim and axially outboard of the inner rim;
   wherein at least one inner raceway is formed in the outer surface of the circumferentially-extending sidewall of the inner ring, such that when the inner ring is mounted in the annular opening defined by the outer ring, the at least one inner raceway is aligned with the at least one outer raceway formed in the annular surface of the outer ring;
   wherein the inner sealing plate of the inner ring and the outer sealing plate of the inner ring are configured to be screwed together via fasteners disposed in a plurality of coronally arranged fastening bores extending parallel to a rotational axis of the inner ring;
   wherein the inner surface of the circumferentially-extending sidewall of the inner ring comprises a first toothed region extending circumferentially about the inner surface of the circumferentially-extending side wall of the inner ring;
   wherein the inner rim of the annular surface of the outer ring comprises a second toothed region extending circumferentially about the inner rim;

wherein the plurality of planetary gears of the gearbox engage the first toothed region of the inner ring and the second toothed region of the inner rim, such that when the sun gear is rotated, the plurality of planetary gears rotate about the sun gear and simultaneously engage the first toothed region and the second toothed region;

wherein the number of teeth $H_1$ of the first toothed region differ from the number of teeth $H_2$ of the second toothed region by a tooth differential $\Delta Z$, and further wherein $\Delta Z$ is equal to the number of planetary gears in the gearbox, such that single-piece planetary gears are arranged around the sun gear at equidistant intervals, thereby resulting in a high speed ratio and high torque reduction in the force required to rotate the sun gear.

2. The hub in accordance with claim 1, wherein the at least one outer raceway of each of a plurality of bearings having differently oriented axes of rotation is formed from a common base body shaping the hub body of the wind turbine.

3. The hub in accordance with claim 1, wherein the jacket of the hub body is sleeve-shaped and provided with through-holes, so as to comprise a rotationally symmetric body.

4. The hub in accordance with claim 1, wherein none of the rotor blades engages the plurality of openings in the hub body.

5. The hub in accordance with claim 1, wherein a rear end face of the rotor blade butts flush against a connection surface of an inner ring and is screwed together therewith.

6. The hub as set forth in claim 1, wherein the second toothed region is provided on the hub body next to the at least one inner raceway for rolling elements of a blade bearing.

7. The hub as set forth in claim 6, wherein at least one row of the teeth of the second toothed region is offset from the at least one inner raceway in parallel with the axis of rotation, toward the interior space of the base body.

8. The hub as set forth in claim 7, wherein the at least one row of teeth is offset from the at least one inner raceway radially to the axis of rotation, and toward the axis of rotation.

9. The hub as set forth in claim 8, wherein the at least one row of teeth is straight-toothed.

10. The hub as set forth in claim 1, wherein for each of said blade bearings, a thrust surface for at least one seal is provided on the hub body concentrically with the at least one outer raceway, and offset outwardly in relation to the hub body away from a center thereof.

11. The hub in accordance with claim 1, wherein for each blade bearing, a fastening means for at least one of a cover plate and a bearing shield is provided on the hub body concentrically with each of the at least one inner raceway and the at least one outer raceway, offset inwardly in relation to the hub body toward a center thereof.

12. The hub in accordance with claim 11, wherein the fastening means comprise fastening bores arranged coronally around an axis of rotation.

13. The hub according to claim 2, wherein the at least one inner raceway disposed opposite to the at least one outer raceway incorporated into the outer ring is incorporated in a convex surface region of the respective inner ring.

14. The hub in accordance with claim 13, wherein the inner ring comprising the at least one inner raceway is additionally provided with a circumferential row of teeth of the first toothed region disposed concentrically with the at least one inner raceway for rolling elements of a rolling bearing.

15. The hub in accordance with claim 14, wherein the row of teeth is offset from the at least one inner raceway radially to the axis of rotation, and toward the axis of rotation.

16. The hub in accordance with claim 13, wherein a cover plate is mounted to the inner ring.

17. The hub in accordance with claim 1, wherein a drive pinion is mounted on a selected one of the cover plate and a bearing shield provided on the hub body.

18. The hub in accordance with claim 17, wherein the drive pinion is disposed concentrically with an axis of rotation of a rolling bearing.

19. The hub in accordance with claim 18, wherein the plurality of planetary gears is arranged in an annular space between outer teeth of the sun gear coupled to at least one of a drive motor, the cover plate or the bearing shield, and the first toothed region.

20. The hub in accordance with claim 19, wherein the planetary gears are mounted without a spider.

21. The hub in accordance with claim 20, wherein the planetary gears are hollow.

22. The hub in accordance with claim 1 wherein $H_1 \neq H_2$.

23. A hub of a wind turbine having rotor blades adjustable about their longitudinal axes and mounted to the hub by means of blade bearings, wherein the hub comprises:
a hub body comprising a jacket, the jacket defining an interior space and having a plurality of openings extending completely through the jacket and communicating with the interior space;
an outer ring formed integral with the jacket and extending about the perimeter of one of the plurality of openings extending through the jacket, the outer ring comprising an outer surface facing away from the jacket, an inner surface facing the interior space, and an annular opening defined by an annular surface;
an inner ring sized to be rotatably received in the annular opening of the outer ring;
an inner sealing plate mounted to the inner surface so as to seal the inner ring from the interior space;
an outer sealing plate facing away from the jacket;
wherein the inner ring comprises a circumferentially-extending sidewall extending between the inner sealing plate and the outer sealing plate, the circumferentially-extending sidewall having an inner surface and an outer surface;
a gearbox comprising a central sun gear and a plurality of planetary gears disposed about the central sun gear;
wherein the outer ring extends radially outboard of the jacket such that the inner surface of the outer ring defines a concave curved region facing the interior space, and such that the outer surface of the outer ring defines a convex curved region facing away from the jacket;
wherein an inner rim is formed in the annular surface of the outer ring such that the inner rim extends about the annular opening of the outer ring, and at least one outer raceway is formed in the annular surface of the outer ring such that the at least one outer raceway extends around the annular opening of the outer ring, the at least one outer raceway being disposed concentric with the inner rim and axially outboard of the inner rim;
wherein at least one inner raceway is formed in the outer surface of the circumferentially-extending sidewall of the inner ring, such that when the inner ring is mounted in the annular opening defined by the outer ring, the at least one inner raceway is aligned with the at least one outer raceway formed in the annular surface of the outer ring;

wherein the inner sealing plate of the inner ring and the outer sealing plate of the inner ring are configured to be screwed together via fasteners disposed in a plurality of coronally arranged fastening bores extending parallel to a longitudinal axis of the rotor blade, so that none of the rotor blades engages in any one of the plurality of openings in the hub body;

wherein the inner surface of the circumferentially-extending sidewall of the inner ring comprises a first toothed region extending circumferentially about the inner surface of the circumferentially-extending side wall of the inner ring;

wherein the inner rim of the annular surface of the outer ring comprises a second toothed region extending circumferentially about the inner rim;

wherein the plurality of planetary gears of the gearbox engage the first toothed region of the inner ring and the second toothed region of the inner rim, such that when the sun gear is rotated, the plurality of planetary gears rotate about the sun gear and simultaneously engage the first toothed region and the second toothed region;

wherein the number of teeth $H_1$ of the first toothed region differ from the number of teeth $H_2$ of the second toothed region by a tooth differential $\Delta Z$, and further wherein $\Delta Z$ is equal to the number of planetary gears in the gearbox, such that single-piece planetary gears are arranged around the sun gear at equidistant intervals, thereby resulting in a high speed ratio and high torque reduction in the force required to rotate the sun gear.

* * * * *